(12) United States Patent
Mae

(10) Patent No.: US 6,966,602 B2
(45) Date of Patent: Nov. 22, 2005

(54) BODY FRAME OF VEHICLE, EMPLOYING LOAD IMPOSING DEVICE

(75) Inventor: Hiroyuki Mae, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/749,639

(22) Filed: Dec. 31, 2003

(65) Prior Publication Data

US 2004/0217627 A1    Nov. 4, 2004

(30) Foreign Application Priority Data

Jan. 7, 2003    (JP) .............................. 2003-001136

(51) Int. Cl.⁷ ................................................ B60K 7/00
(52) U.S. Cl. ........................... 296/187.03; 296/187.02; 293/133; 293/134
(58) Field of Search ...................... 296/187.03, 187.06, 296/187.09, 187.1, 187.11, 187.02, 210, 184.1, 296/193.01, 205; 293/137, 134, 133, 132, 293/121, 136; 188/371, 377

(56) References Cited

U.S. PATENT DOCUMENTS

| | | | |
|---|---|---|---|
| 3,741,560 A * | 6/1973 | Schaller ...................... 293/121 |
| 3,831,921 A * | 8/1974 | Negado ....................... 293/137 |
| 3,834,483 A * | 9/1974 | Palmer ........................ 293/134 |
| 3,887,223 A * | 6/1975 | Bez .............................. 293/133 |
| 3,972,551 A * | 8/1976 | Fannin ........................ 293/134 |
| 3,983,962 A * | 10/1976 | Torke ........................... 293/133 |
| 4,114,937 A * | 9/1978 | Norlin ......................... 293/137 |
| 4,893,857 A * | 1/1990 | Bobinger et al. ............ 293/136 |
| 4,930,823 A * | 6/1990 | Rivera ......................... 293/133 |
| 5,048,345 A * | 9/1991 | Hagiwara et al. ...... 296/187.03 |
| 5,181,699 A * | 1/1993 | Chang ......................... 293/134 |
| 5,213,391 A * | 5/1993 | Takagi ......................... 296/205 |
| 5,619,784 A * | 4/1997 | Nishimoto et al. ..... 296/193.01 |
| 5,678,715 A * | 10/1997 | Sjostedt et al. .............. 220/1.5 |
| 6,092,862 A * | 7/2000 | Kuwahara ................. 296/184.1 |
| 6,148,970 A * | 11/2000 | Akad .......................... 293/133 |
| 6,193,303 B1 | 2/2001 | Urushiyama et al. |
| 6,217,090 B1 * | 4/2001 | Berzinji ...................... 293/132 |
| 6,302,476 B1 * | 10/2001 | Larsson et al. .......... 296/187.1 |
| 6,378,933 B1 * | 4/2002 | Schoen et al. ......... 296/187.02 |
| 6,409,253 B2 * | 6/2002 | Larsson et al. .......... 296/187.1 |
| 6,517,147 B2 * | 2/2003 | Grimm ........................ 296/210 |
| 6,554,176 B2 * | 4/2003 | McGill ..................... 228/112.1 |
| 6,736,448 B2 * | 5/2004 | Hanakawa et al. ..... 296/187.09 |
| 6,786,533 B2 * | 9/2004 | Bock et al. ............ 296/187.02 |
| 6,793,327 B2 * | 9/2004 | Huliba ........................ 347/73 |
| 2004/0191107 A1 * | 9/2004 | Ishikawa et al. ............... 419/2 |

FOREIGN PATENT DOCUMENTS

| DE | 199 63 068 | 6/2001 |
|---|---|---|
| EP | 0 926 049 | 6/1999 |

(Continued)

*Primary Examiner*—Kiran B. Patel
(74) *Attorney, Agent, or Firm*—Hamre, Schumann, Mueller & Larson, P.C.

(57) ABSTRACT

A body frame of a vehicle for securing, in control of buckling, necessary strength without increasing the size of the frame member, and for reducing impact deceleration produced at the start of buckling. The body frame of has a frame member provided in one of a front portion and a rear portion of the vehicle; and a load imposing device, provided at an end of the frame member, for imposing a load on the frame member toward at least two opposite directions which are substantially perpendicular to a longitudinal direction of the frame member, when impact on the frame member is anticipated or imposed. The load imposing device may have a member made of a shape memory alloy.

7 Claims, 4 Drawing Sheets

FOREIGN PATENT DOCUMENTS

JP 07-165110 6/1995
JP 7-165110 6/1995

* cited by examiner

BODY FRAME OF VEHICLE, EMPLOYING LOAD IMPOSING DEVICE

BACKGROUND OF THE INVENTION

1. Field of the Invention

The present invention relates to a body frame for vehicles. Priority is claimed on Japanese Patent Application No. 2003-001136, filed Jan. 7, 2003, the content of which is incorporated herein by reference.

2. Description of the Related Art

In a known vehicle body structure, concave portions called "beads" are provided at an end portion of the front frame, so that when a compressive load is imposed on the front frame, buckling of the front frame is controlled in a manner such that the front frame buckles from the concave portions (refer to Japanese Unexamined Patent Application, First Publication No. Hei 07-165110).

In the above known structure, the strength of the frame member itself is decreased due to the concave portions; thus, the size of the frame member should be increased so as to secure necessary strength, thereby increasing the weight of the vehicle. Additionally, in such a passive control in which concave portions are provided at the frame member, impact deceleration produced at the start of buckling is increased. In other words, high impact deceleration is produced even in a low-speed crash.

SUMMARY OF THE INVENTION

In consideration of the above circumstances, an object of the present invention is to provide a body frame of a vehicle for securing, in control of buckling, necessary strength without increasing the size of the frame member, and for reducing impact deceleration produced at the start of buckling.

Therefore, the present invention provides a body frame of a vehicle, comprising:

a frame member (e.g., a front side frame 12 in an embodiment explained below) provided in one of a front portion and a rear portion of the vehicle; and a load imposing device (e.g., a load imposing device 13 in the embodiment), provided at an end of the frame member, for imposing a load on the frame member toward at least two opposite directions which are substantially perpendicular to a longitudinal direction of the frame member, when impact on the frame member is anticipated or imposed.

According to the above structure, the buckling of the frame member is controlled by imposing a load by the load imposing device on the frame member toward at least two opposite directions which are substantially perpendicular to a longitudinal direction of the frame member, when impact on the frame member is anticipated or imposed. Therefore, it is unnecessary to provide concave portions at the frame member. Accordingly, in control of the buckling, necessary strength of the frame member can be secured without increasing the size of the frame member, and impact deceleration produced at the start of buckling can be reduced.

As a typical example, the load imposing device has a member (e.g., a spring 25 in the embodiment) made of a shape memory alloy. In this case, the load imposing device imposes a load on the frame member by using a member made of a shape memory alloy, so that the load imposed state can be continued for a desired time, thereby easily controlling the operation timing of the load imposing device.

The load imposing device may have a spring. In this case, the spring is one of a coil spring and a plate spring.

The load imposing device may have a band-shaped member made of a shape memory alloy, which is wound along one of an outer-peripheral wall and an inner-peripheral wall of the frame member.

DETAILED DESCRIPTION OF THE INVENTION

Hereinafter, the body frame of a vehicle, as an embodiment according to the present invention, will be explained with reference to the drawings.

Figure 1:
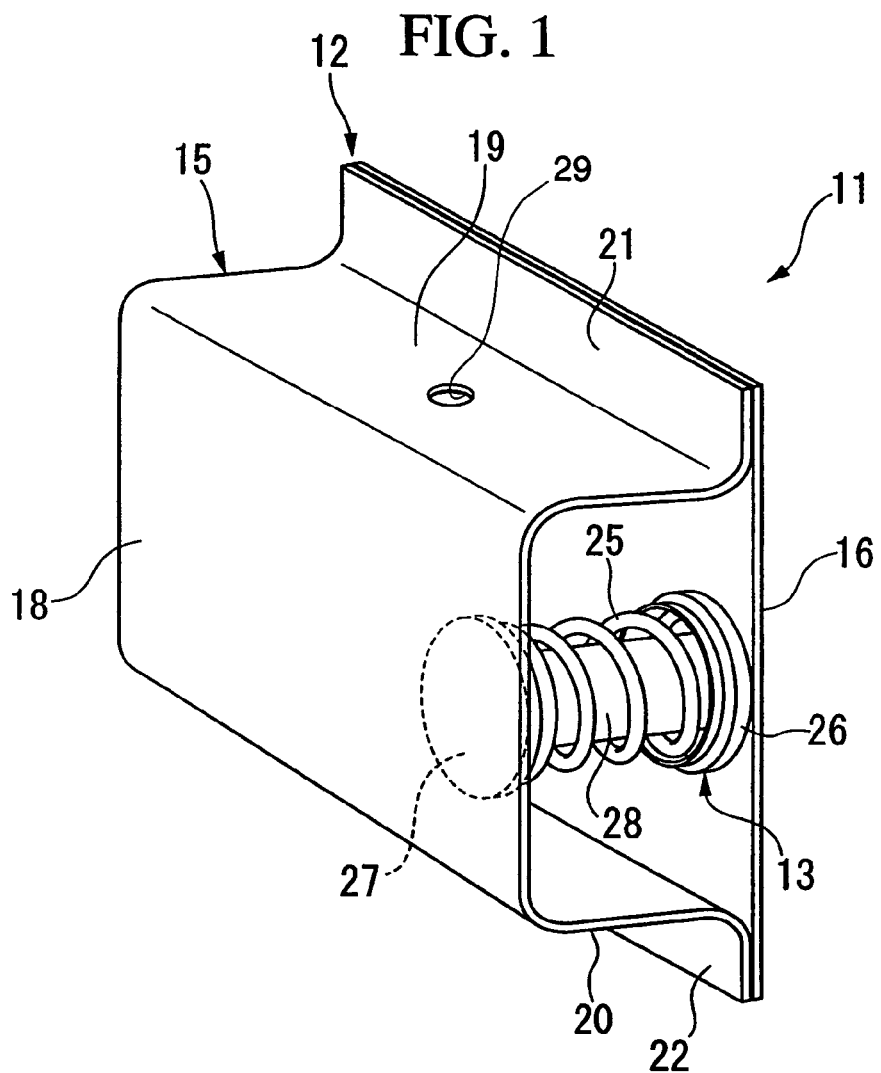
FIG. 1 is a perspective view showing the body frame of a vehicle, as an embodiment according to the present invention.

As shown in FIG. 1, the body frame 11 of the present embodiment has a front side frame 12 (i.e., a frame member) and a load imposing device 13. The front side frame 12 is a framework member of the vehicle, which is provided at a front portion of the vehicle (body) and in the front-back direction of the vehicle. The load imposing device 13 is provided at the front end of the front side frame 12, that is, the front end in the front-back direction of the vehicle. When an impact on the front side frame 12 is anticipated or received, the load imposing device 13 imposes a load on the front side frame 12 toward at least two opposite directions which are substantially perpendicular to the longitudinal direction of the front side frame 12. In addition, an extension (not shown) is attached to the front end of the front side frame 12, that is, the front end in the front-back direction of the vehicle, where the extension deforms prior to deformation of the front side frame 12 when receiving impact.

The front side frame 12, made of steel or the like, is formed by joining a frame forming member 15 having a U-shaped cross section and a frame forming member 16 having a plate shape, in a manner such that the frame forming members 15 and 16 form a closed section. The load imposing device 13 is provided at the front end (in the front-back direction of the vehicle) and inside the front side frame 12 and is arranged in the right-left direction of the vehicle.

More specifically, the frame forming member 15 has (i) a side plate portion 18 formed along the vertical direction and also the front-back direction of the vehicle, (ii) an upper plate portion 19 and a lower plate portion 20, which respectively extend, in the right-left direction of the vehicle, from the upper and lower edges of the side plate portion 18, and which are arranged in parallel to each other along the front-back direction of the vehicle, and (iii) an upper flange 21 and a lower flange 22, which respectively extend from the upper plate portion 19 and the lower plate portion 20 in the vertical direction in a manner such that the flanges 21 and 22 extend away from each other, where the upper flange 21 and the lower flange 22 extend from sides (of the plate portions 19 and 20) opposite from the sides which join the side plate portion 18. The upper flange 21 and the lower flange 22 are joined to the plate-shaped frame forming member 16. Both ends of the load imposing device 13 are respectively joined to the side plate portion 18 (of the flame forming member 15) and the frame forming member 16 which are in parallel to each other.

Figure 2:
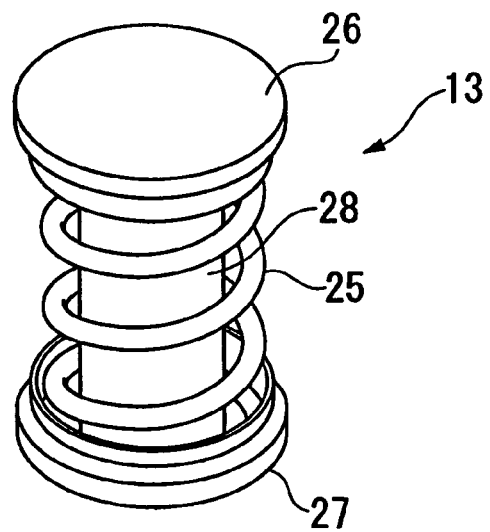
FIG. 2 is a perspective view showing the load imposing device used in the body frame in the embodiment.

As shown in FIG. 2, the load imposing device 13 includes (i) a spring (member) 25 which is made of a shape memory alloy and is coiled, (ii) a pair of contact members 26 and 27, which are attached to both ends of the spring 25, (iii) an electric heater 28, provided inside the spring 25, for heating the spring 25, and (iv) a power source (not shown) for supplying power to the electric heater 28. As shown in FIG. 1, in this load imposing device 13, the pair of contact members 26 and 27 are fastened to both side walls (in the right-left direction of the vehicle) of the front side frame 12, that is, to the frame forming member 16 and the side plate portion 18 of the frame forming member 15 by welding or the like, so as to hold the load imposing device 13 inside the front side frame 12.

In the load imposing device 13, while the spring 25 is not heated by the electric heater 28, the spring 25 does not stretch and no load is imposed on the front side frame 12. Conversely, when the spring 25 is heated by the electric heater 28, the spring 25, made of a shape memory alloy, extends and stretches so that a load is imposed on the front side frame 12 toward two opposite directions along a right-left direction which is substantially perpendicular to the longitudinal direction of the front side frame 12.

In the body frame 11 (of the vehicle) having the above-explained load imposing device 13 in the present embodiment, when a crash into an object in front of the vehicle is anticipated by radar sensing for detecting such a forward object, or when a crash happens and impact due to the crash is detected (i.e., when impact is imposed), a part of the impact energy, which cannot be absorbed by deformation of the extension, is absorbed by buckling of the front side frame 12. Here, in the load imposing device 13, the spring 25 is heated and lengthened by the electric heater 28. Accordingly, a load is imposed to the front side frame 12 toward two directions (in a right-left direction) which are perpendicular to the direction of the compressive load which is imposed on the front side frame 12 along the longitudinal direction of the front side frame 12, thereby controlling the buckling of the front side frame 12.

That is, the buckling of the front side frame 12 is controlled by imposing a load on the front side frame 12 toward two opposite directions in the right-left direction; thus, it is unnecessary to provide concave portions at the front side frame 12. Therefore, in control of the buckling, necessary strength of the front side frame 12 can be secured without increasing the size of the front side frame 12, and impact deceleration produced at the start of buckling can be reduced. Here, the spring 25, made of a shape memory alloy, may be made extend and contract by performing heating control of the electric heater 28.

Figure 3:
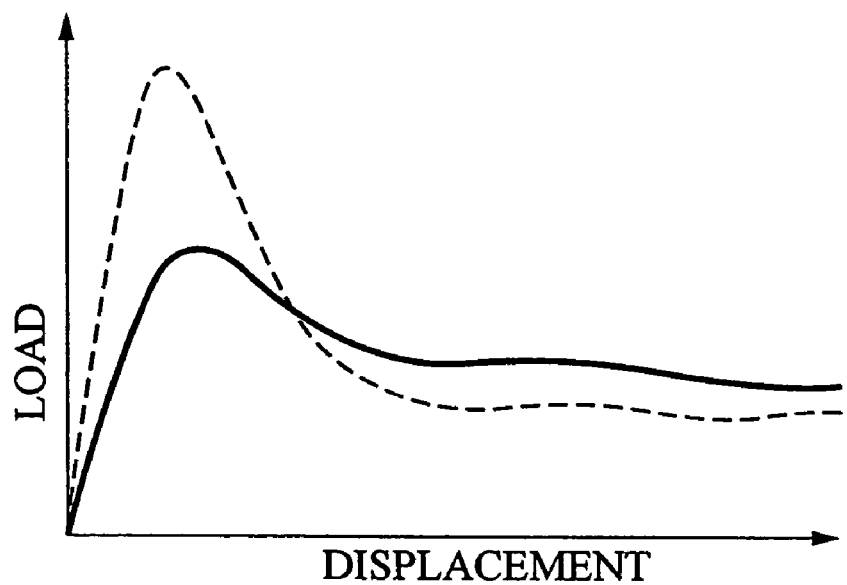
FIG. 3 is a graph showing (i) the characteristics (see the solid line) of the buckling load (along the vertical axis) versus the displacement (along the horizontal axis) for the body frame of the embodiment of the present invention, and (ii) the corresponding characteristics (see the dashed line) of a body frame which has no load imposing device.
Figure 4:
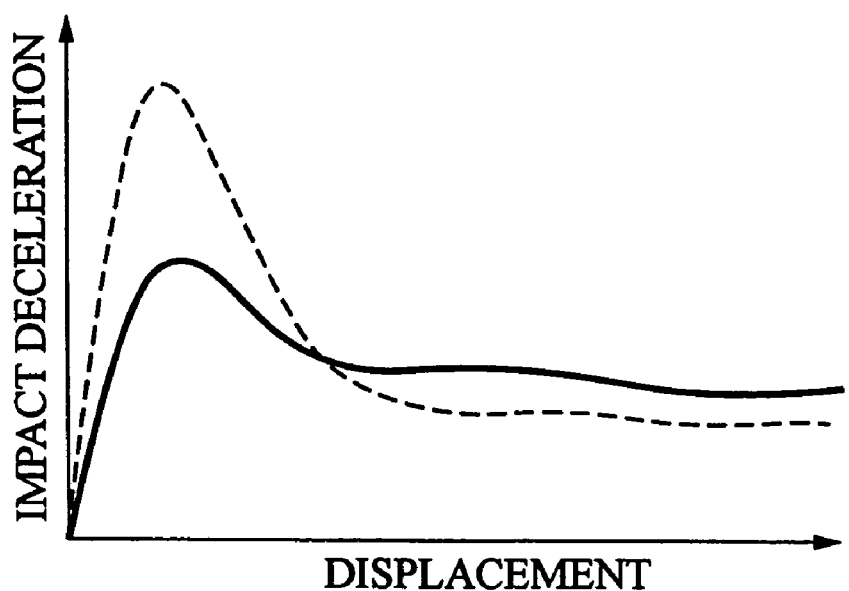
FIG. 4 is a graph showing (i) the characteristics (see the solid line) of the impact deceleration (along the vertical axis) versus the displacement (along the horizontal axis) for the body frame of the embodiment of the present invention, and (ii) the corresponding characteristics (see the dashed line) of a body frame which has no load imposing device.

More specifically, in the front side frame 12 having the load imposing device 13, as shown by the solid line in FIG. 3 (in which "DISPLACEMENT" indicates displacement due to buckling), both the buckling load (i.e., minimum compressive load for inducing buckling) and the gradient of the load can be reduced at the start of buckling, in comparison with a front side frame which does not employ the load imposing device, indicated by the dashed line in FIG. 3. In addition, as shown by the solid line in FIG. 4 (in which "DISPLACEMENT" indicates displacement due to buckling), the impact deceleration produced at the start of buckling can be reduced in comparison with a front side frame which does not employ the load imposing device, indicated by the dashed line in FIG. 4.

For example, in a low-speed crash in which a crash of the vehicle into a forward object at a low speed is detected using radar sensing, when a load is imposed on the front side frame 12 toward two opposite directions along a right-left direction (of the front side frame 12) by heating the spring 25, made of a shape memory alloy, via the electric heater 28 and by stretching the spring 25, buckling is accelerated and the buckling load is reduced, thereby reducing the impact deceleration. As a result, it is possible to prevent an erroneous action of the airbag in a low-speed crash.

On the other hand, in a high-speed crash in which a crash of the vehicle into a forward object at a high speed is detected using radar sensing, if no heating using the electric heater 28 is executed in the load imposing device 13 and thus no load is imposed on the front side frame 12, then buckling is not accelerated and the buckling load is increased, thereby increasing the impact deceleration. As a result, it is possible to quickly deploy the airbag in a high-speed crash.

If a hole 29 (for a jig or the like) is provided in the front side frame 12, as shown in FIG. 1, then conventionally, breakage occurs in the front side frame 12 from such a hole 29 when a crash happens. However, when employing the load imposing device 13, the buckling is mainly produced around the front end of the frame. Therefore, it is possible to prevent the stress from being concentrated around the hole 29, and the buckling of the front side frame 12 can be controlled so as to start the buckling from the front end.

The above-explained body frame 11 of the vehicle may be modified as explained below.

Figure 5:
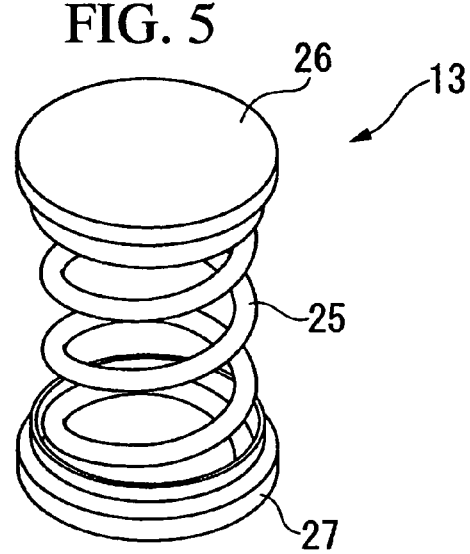
FIG. 5 is a perspective view showing a variation of the load imposing device used in the body frame in the embodiment.

As shown in FIG. 5, instead of providing the electric heater 28 inside the spring 25 of the load imposing device 13, power may be directly supplied to the spring 25, made of a shape memory alloy, by using a power source (not shown), so as to stretch the spring 25. According to this structure, the spring can be quickly stretched, thereby improving the responsiveness. Here, the spring 25 may be suitably heated so as to make the spring 25 (made of a shape memory alloy) contract and extend.

Figure 6:
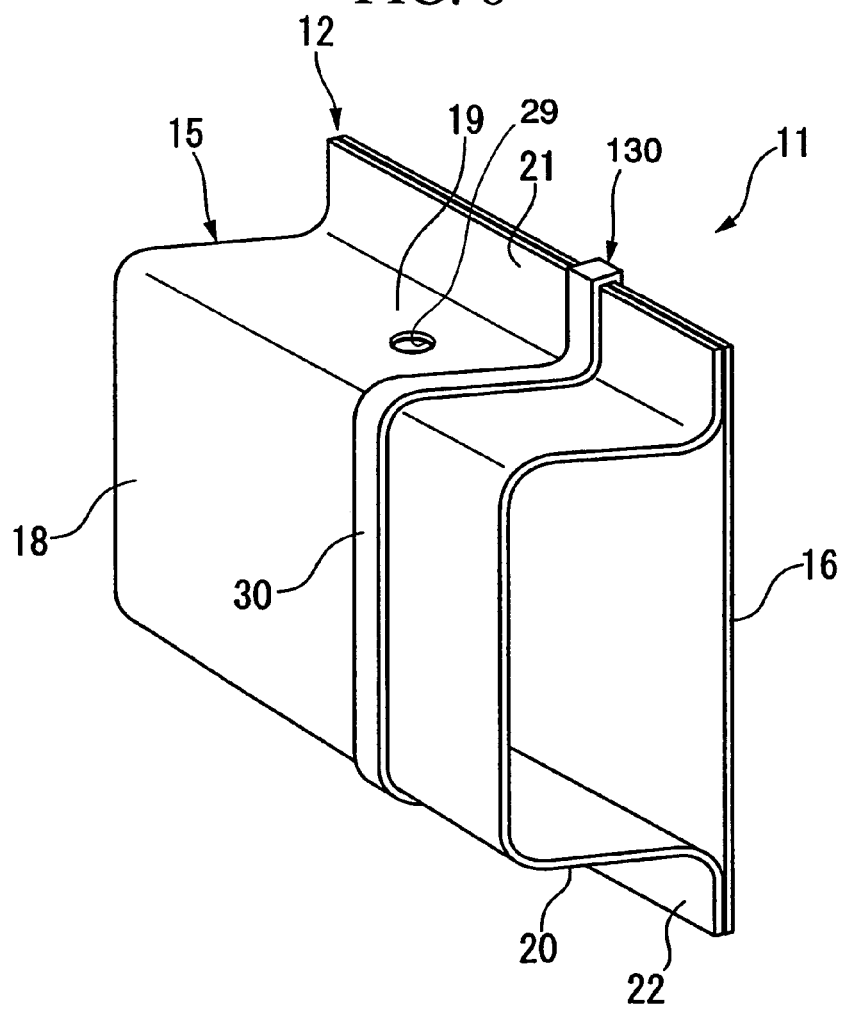
FIG. 6 is a perspective view showing a variation of the body frame in the embodiment.

Instead of the load imposing device 13, a load imposing device 130 as shown in FIG. 6 may be employed. The load imposing device 130 has (i) a band 30 (i.e., a band-shaped member) which is made of a shape memory alloy and is wound around the front side frame 12 (see FIG. 6), (ii) an electric heater (not shown) which may be provided inside the front side frame 12, and (iii) a power source (not shown) for supplying power to the electric heater. In this structure, heating using the electric heater is performed so as to impose a load in a manner such that the front side frame 12 is tightened up by the band 30 from all directions in the vertical and right-left directions. Here, the band 30 may be wound along the inner-peripheral wall of the front side frame 12 so as to impose force for expanding the front side frame 12 from the inside of the frame.

In another variation, instead of using the spring 25 of the load imposing device 13, increase in the air pressure due to gunpowder ignition may be used for forcing the pair of contact members 26 and 27 towards the opposite directions. However, according to the structure using a shape memory alloy in the load imposing device 13 (so as to impose a load on the front side frame 12), the load imposed state can be continued for a desired time, thereby easily controlling the operation timing of the load imposing device 13. Therefore, a structure using a shape memory alloy is preferable.

In addition, instead of the spring, a rod (member) made of a shape memory alloy may be used.

Figure 7:
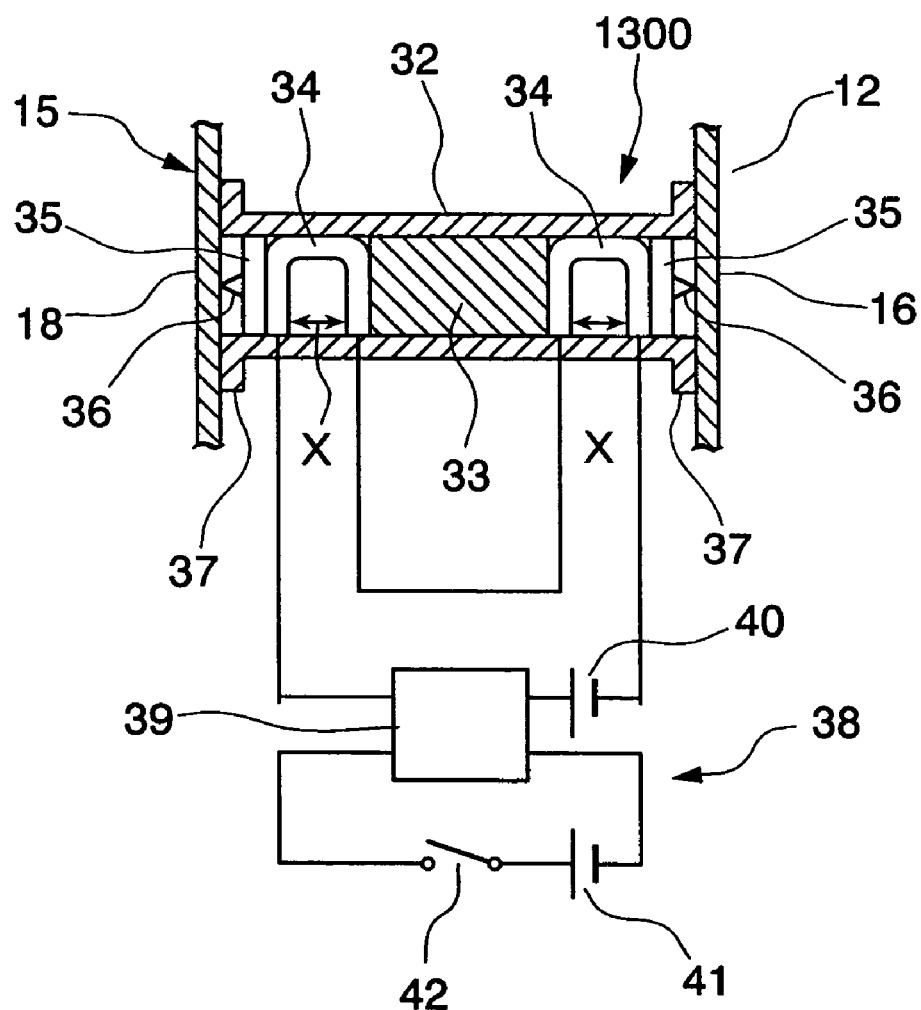
FIG. 7 is a diagram including a sectional view of the main structural portion of another variation of the body frame in the embodiment.

Furthermore, a plate spring may be used instead of the coil-shaped spring 25. That is, instead of the load imposing device 13, a load imposing device 1300 as shown in FIG. 7 may be employed. In the load imposing device 1300, a fastening member 33 is fixed at the center of a cylinder-shaped or square-shaped pipe member 32, and plate springs 34 and 34 are provided at both sides of the fastening member 33 in the pipe member 32. In addition, pressing members 35 and 35 are respectively provided outside the plate springs 34 and 34.

Figure 8:
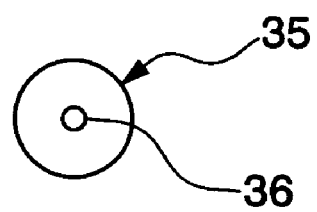
FIG. 8 is a side view of the pressing member in the load imposing device of the body frame shown in FIG. 7.

Here, the pressing member 35 has a structure as shown in FIG. 8, in which the pressing member 35 has a disk shape. In FIG. 8, a protruding portion 36 is formed at the center of the pressing member 35, and each pressing member 35 is arranged in the pipe member 32 in a manner such that the protruding portion 36 is present at the opposite side to the corresponding plate springs 34 (i.e., the protruding portion 36 does not face or contact the plate springs 34).

At both opening ends of the pipe member 32, flanges 37 and 37 are respectively formed. In the load imposing device 1300, the flanges 37 and 37 are fastened to both side walls (in the right-left direction) of the front side frame 12, that is, to the frame forming member 16 and the side plate portion 18 of the frame forming member 15, by welding, using bolts, or the like.

In this load imposing device 1300, power is directly supplied to the plate springs 34 and 34, which are made of a shape memory alloy, by using the power source 38 (see FIG. 7) so as to heat the plate springs 34 and 34. The power source 38 includes (i) a photo MOS relay 39 connected to the plate springs 34 and 34, (ii) electric cells 40 and 41, and (iii) a switch 42. While the switch 42 is off and the plate springs 34 and 34 are not heated by the power source 38, the plate springs 34 and 34 do not expand so that no load is imposed on the front side frame 12. Conversely, when the switch 42 is turned on and the plate springs 34 and 34 are heated by the power source 38, each plate spring 34, made of a shape memory alloy, expands towards the directions indicated by the double-headed arrow X in FIG. 7. Accordingly, the plate springs 34 and 34 are stretched so that a load is imposed, via the protruding portions 36 of the pressing members 35, on the front side frame 12 towards two opposite directions (in the right-left direction) substantially perpendicular to the longitudinal direction of the front side frame 12.

When the plate springs 34 and 34 are used as explained above, a larger load can be produced by using a spring member having a smaller size, in comparison with a coil spring. Therefore, the amount of shape memory alloy used can be reduced, and thus an actuator having a high output and a low price can be realized.

Instead of providing the load imposing device (13, 130, or 1300) at the front end of the front side frame 12, the load imposing device may be provided at the rear end of a rear frame which is also a framework member (of the vehicle body) along the front-back direction of the vehicle and which is provided at a rear portion of the vehicle. In this case, effects similar to those obtained by the structure in which the load imposing device 13 is provided at the front end of the front side frame 12 can also be obtained.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A body frame of a vehicle, comprising:
   a frame member, having opposite faces which face each other, provided in one of a front portion and a rear portion of the vehicle; and
   a load imposing device, provided at an end of the frame member, for imposing a load an the opposite faces of the frame member toward at least two opposite directions which are substantially perpendicular to a longitudinal direction of the frame member, when impact on the frame member along the longitudinal direction of the frame member is anticipated or imposed.

2. The body frame as claimed in claim 1, wherein the load imposing device has a member made of a shape memory alloy.

3. The body frame as claimed in claim 1, wherein the load imposing device has a spring.

4. The body frame as claimed in claim 3, wherein the spring is one of a coil spring and a plate spring.

5. The body frame as claimed in claim 1, wherein the load imposing device has a band-shaped member made of a shape memory alloy, which is wound along an outer-peripheral wall of the frame member.

6. The body frame as claimed in claim 1, wherein the frame member is a side frame.

7. The body frame as claimed in claim 3, wherein the spring is provided between the opposite faces of the frame member.

* * * * *